United States Patent

Kasuga et al.

Patent Number: 5,875,278
Date of Patent: Feb. 23, 1999

[54] RECORDING/REPRODUCING DEVICE COMPRISING A PLURALITY OF AUDIO CHANNELS AND A ROTARY ENCODER WHICH CONTROLS TWO INDEPENDENT LEVEL ADJUSTING MEANS

[75] Inventors: Yuka Kasuga, Tokyo; Toshiya Yatomi, Kanagawa-ken, both of Japan

[73] Assignee: Canon Kabushiki Kaisha, Tokyo, Japan

[21] Appl. No.: 378,318

[22] Filed: Jan. 25, 1995

Related U.S. Application Data

[63] Continuation of Ser. No. 146,453, Nov. 1, 1993, abandoned, which is a continuation of Ser. No. 780,870, Oct. 18, 1991, abandoned.

[30] Foreign Application Priority Data

Oct. 25, 1990 [JP] Japan .................................... 2-285963

[51] Int. Cl.⁶ ............................ H04N 9/68; H04N 9/793; H04N 5/93; H04N 5/923
[52] U.S. Cl. .................................. 386/9; 386/54; 386/93; 386/96
[58] Field of Search ..................................... 358/335, 341, 358/343, 310, 315; 348/705; 360/19.1; 386/1, 10, 39, 45, 46, 54, 93, 96, 102, 9, 113, 116, 21; H04N 5/76, 5/78, 5/781, 5/783, 9/79, 5/262, 5/268, 5/91

[56] References Cited

U.S. PATENT DOCUMENTS

| | | | |
|---|---|---|---|
| 3,953,889 | 4/1976 | Yanagimachi et al. | 358/330 |
| 4,613,912 | 9/1986 | Shibata et al. | 358/343 |
| 4,907,079 | 3/1990 | Turner et al. | 358/181 |
| 5,177,618 | 1/1993 | Dunlap et al. | 358/336 |
| 5,276,509 | 1/1994 | Mizuno et al. | 358/474 |

OTHER PUBLICATIONS

Sony Basis Video Recording Course Booklet #7, "Luminance Processing", 1988, pp. 9–10.

Peter Utz, "Video User's handbook, chapter 5", 1980, pp. 51–67.

Primary Examiner—Douglas W. Olms
Assistant Examiner—David R Vincent
Attorney, Agent, or Firm—Robin, Blecker & Daley

[57] ABSTRACT

A device for adjusting audio and video signals includes two rotary encoders, one for plural audio adjusting circuits which are arranged to adjust audio signals and the other for plural video adjusting circuits which are arranged to adjust video signals. The rotary encoders are arranged to selectively actuate the plural audio adjusting circuits and the plural video adjusting circuits respectively. The arrangement not only simplifies the operation of the device but also reduces the number of necessary parts.

33 Claims, 2 Drawing Sheets

RECORDING/REPRODUCING DEVICE COMPRISING A PLURALITY OF AUDIO CHANNELS AND A ROTARY ENCODER WHICH CONTROLS TWO INDEPENDENT LEVEL ADJUSTING MEANS

This is a continuation application under 37 CFR 1.62 of prior application Ser. No. 08/146,453 filed on Nov. 1, 1993 (abandoned) which is a continuation of Ser. No. 07/780,870 filed on Oct. 18, 1991 (abandoned).

BACKGROUND OF THE INVENTION

1. Field of the Invention

This invention relates to a signal adjusting device and more particularly to a device for making adjustment relative to video and audio signals.

2. Description of the Related Art

The conventional apparatuses for recording and reproducing video signals on and from a magnetic tape (hereinafter referred to as VTRs) have input adjusting devices arranged in most cases to adjust video signals, such as a luminance signal, chrominance signals, and also the audio signal levels of individual channels. Some of the VTRs have been arranged to permit adjustment of all these signals with a single adjustment knob. The arrangement to adjust the signals by using adjustment knobs discretely arranged for respective different signals and channels increases the number of parts and thus requires a larger space. The arrangement to adjust the audio signal levels and video signals with a single adjustment knob makes operation very difficult for the operator and thus has presented a problem in respect of the operability of the apparatus.

SUMMARY OF THE INVENTION

This invention is directed to the solution of the above-stated problems. It is therefore an object of the invention to provide an adjusting apparatus which is arranged to permit not only reduction in the number of parts but also improvement in operability of the apparatus.

An adjusting apparatus which is arranged as an embodiment of this invention comprises of a plurality of audio adjusting means for making adjustment relative to audio signals respectively; a plurality of video adjusting means for making adjustment relative to video signals respectively; a first rotary encoder used for the audio signals; a second rotary encoder used for the video signals; first selecting means for selectively actuating the plurality of audio adjusting means according to an operation of the first rotary encoder; and second selecting means for selectively actuating the plurality of video adjusting means according to an operation of the second rotary encoder.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
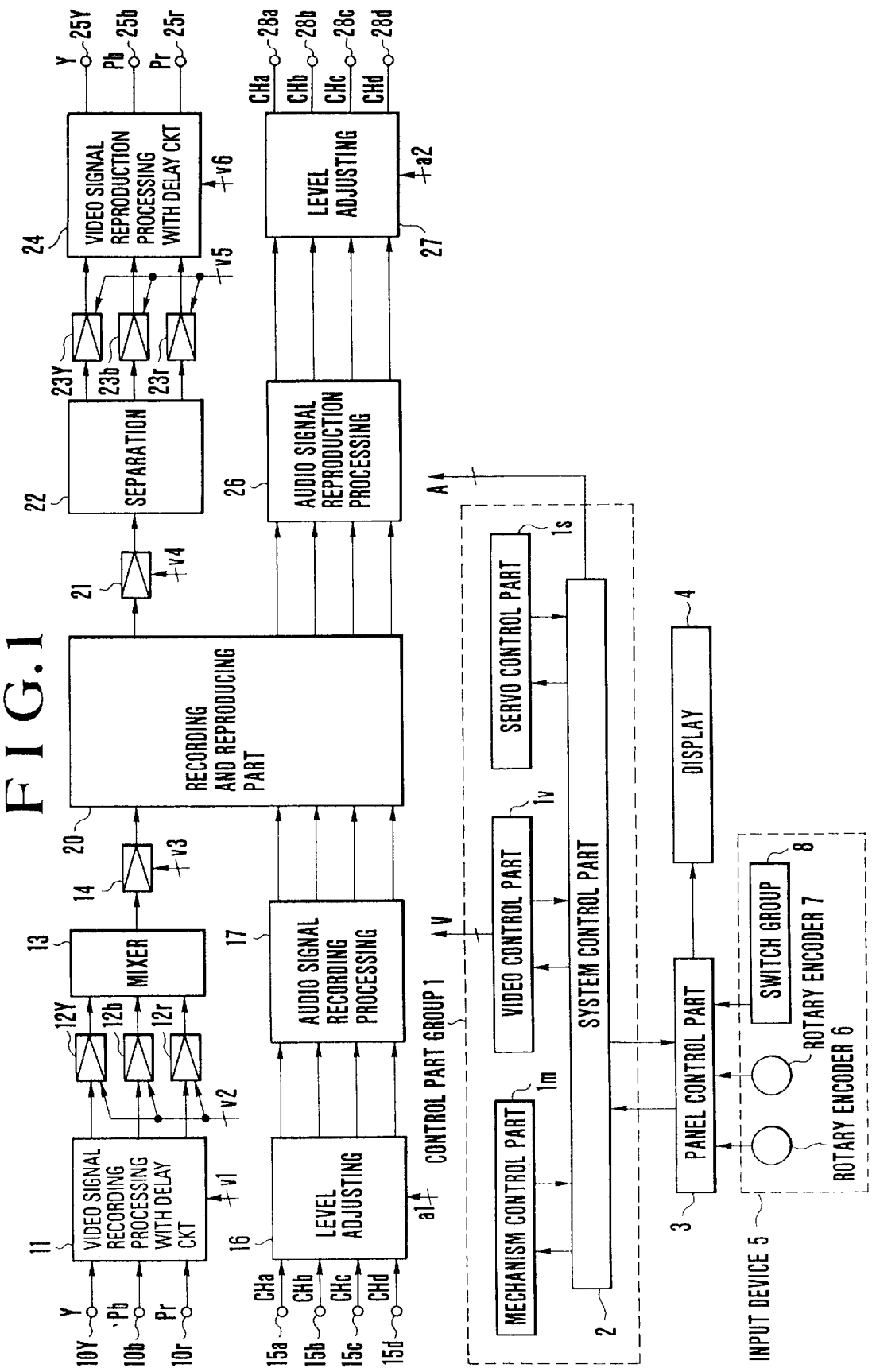
FIG. 1 is a block diagram showing the arrangement of a video signal recording and reproducing apparatus which is arranged as an embodiment of this invention.
Figure 2:
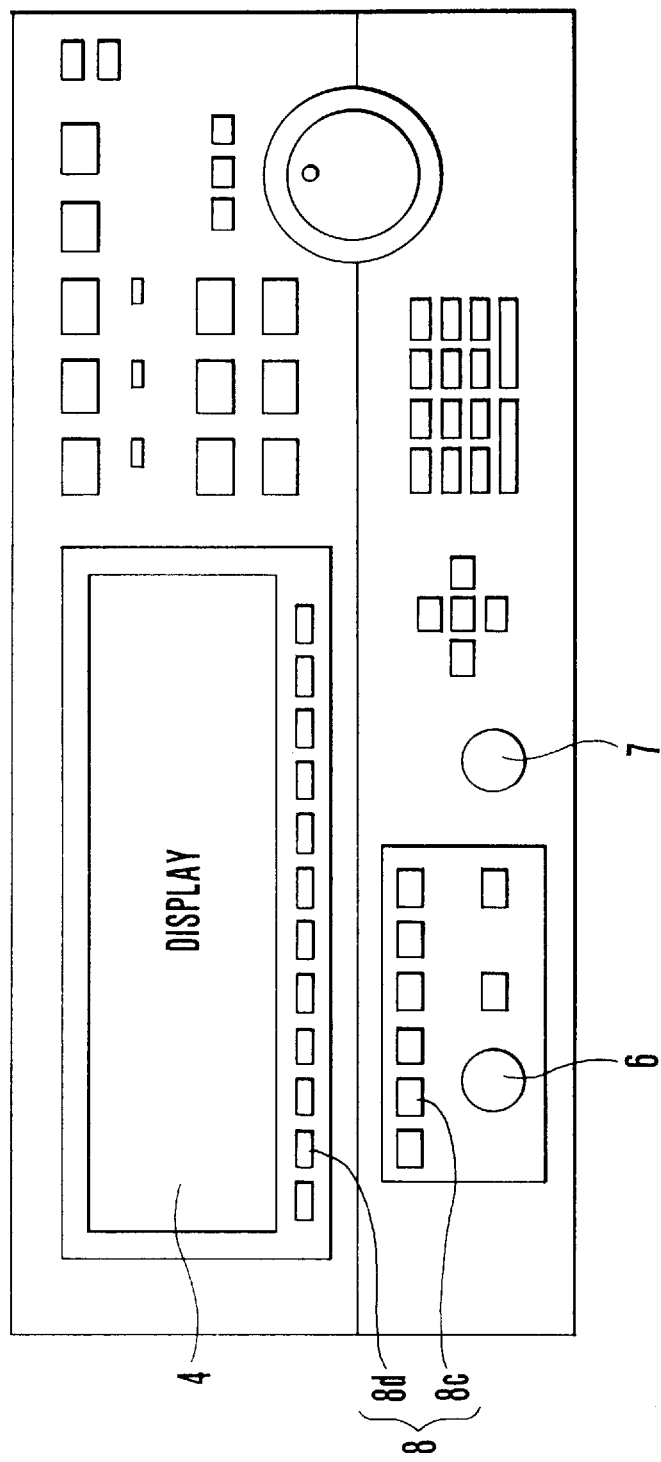
FIG. 2 shows the arrangement of the operation panel of the apparatus shown in FIG. 1.

The following describes an embodiment of this invention in detail with reference to the drawings:

FIG. 1 shows the arrangement of a video signal recording and reproducing apparatus (VTR). FIG. 2 shows the front panel of the apparatus shown in FIG. 1.

Referring to FIGS. 1 and 2, a control part group 1 which is arranged to control the component parts of the body of the VTR includes a mechanism control part 1m, a video control part 1v, a servo control part 1s and a system control part 2. The system control part 2 is the central part of the control part group 1 and is arranged to control the flow of data between microcomputers. An input device 5 includes a rotary encoder 6 for audio level adjustment, a rotary encoder 7 for video signal adjustment and a switch group 8. The switch group 8 includes selection buttons 8c which are provided for selection of an audio channel to be adjusted by the rotary encoder 6, and function buttons 8d which are arranged to permit switching the functions and purposes thereof from one over to another by means of software according to the state of the VTR and the mode of the panel.

A panel control part 3 serves as an interface between the user and the machine and is arranged to convert an input signal from the input device 5 into a control signal for the VTR body and to send the control signal to the system control part 2. The VTR is provided with a display part 4. These control parts are electrically interconnected for input and output of signals between them.

Since the level of the audio signal is frequently adjusted, a mechanism for audio level adjustment must excel in operability. In the case of this embodiment, the selection buttons 8c are provided for selection of audio channels. The level of any desired audio channel can be adjusted by using one of the buttons 8c in conjunction with the rotary encoder 6 which is provided for that purpose.

Meanwhile, the video signals of varied kinds which will be described later are not frequently adjusted in general. In the case of this embodiment, the subject of adjustment is selected with one of the function buttons 8d. The video signal is then adjusted by the rotary encoder 7 only with respect to the subject matter thus selected.

The details of the flows of the video and audio signals and the matters to be adjusted by the rotary encoders 6 and 7 are as described below:

A luminance signal Y and two color-difference signals Pb and Pr are inputted to input terminals 10Y, 10b and 10r, respectively. These signals Y, Pb and Pr are supplied to a video signal recording processing circuit 11. The circuit 11 then performs various processes to make the signals Y, Pb and Pr into a signal form suited for recording. The signals thus processed are supplied to amplifiers 12Y, 12b and 12r. The signals Y, Pb and Pr outputted from the amplifiers 12Y, 12b and 12r are mixed together by a mixer 13. The output signal of the mixer 13 is supplied to a recording and reproducing part 20 via a recording amplifier 14 to be recorded on a magnetic tape together with audio signals by means of a known rotary head.

Audio signal input terminals 15a, 15b, 15c and 15d are arranged for respective different audio signal channels to supply audio signals CHa, CHb, CHc and CHd of these channels to a level adjustment circuit 16. The levels of these audio signals are adjusted by the level adjustment circuit 16. After the level adjustment, these audio signals are supplied to an audio signal recording processing circuit 17 to be converted into a signal form suited for magnetic recording. The signals of four channels outputted from the audio signal recording processing circuit 17 are supplied respectively to the recording and reproducing part 20 to be recorded on the magnetic tape along with the above-stated video signal.

Next, the operation to be performed on the reproducing side of the VTR is described as follows: a video signal which is reproduced by the recording and reproducing part 20 is amplified by a reproduction amplifier 21. The amplified reproduced video signal is supplied to a separation circuit 22 to be separated into signals Y, Pb and Pr. The levels of these reproduced signals Y, Pb and Pr are then individually adjusted by amplifiers 23Y, 23b and 23r. With their levels thus adjusted by the amplifiers 23Y, 23b and 23r, the signals Y, Pb and Pr are brought back into their original signal form by a video signal reproduction processing circuit 24 and are then outputted from output terminals 25Y, 25b and 25r to the outside, respectively.

The audio signals of four channels are reproduced by the recording and reproducing part 20. These audio signals are brought back into the original signal form by an audio signal reproduction processing circuit 26. After that, these audio signals are supplied to a level adjustment circuit 27 to have their levels adjusted there. The level-adjusted audio signals are outputted from output terminals 28a, 28b, 28c and 28d as four-channel audio signals CHa, CHb, CHc and CHd.

The system control part 2 is arranged to output an audio adjustment signal A in response to the selection of the selection buttons 8c and the operation of the audio rotary encoder 6. The audio adjustment signal A includes a recording-side level adjustment signal a1 for individually adjusting the levels of the audio signals of different channels on the recording side and a reproduction-side level adjustment signal a2 for individually adjusting the levels of the audio signals of different channels on the reproduction side.

The signal a1 is supplied to the level adjustment circuit 16 to adjust the input levels of the audio signals CHa, CHb, CHc and CHd of the different channels. The other signal a2 is supplied to the level adjustment circuit 27 to adjust the output levels of the audio signals CHa, CHb, CHc and CHd of the different channels. The selection buttons 8c mentioned in the foregoing are arranged to designate and select a level adjusting channel and also to designate either the input signal or the output signal as a level adjusting audio signal. The level of the audio signal thus designated is adjusted by the operation of the rotary encoder 6.

The video control part 1v is arranged to output a video adjustment signal V in response to the operation of the video rotary encoder 7 and that of the function buttons 8d. The video adjustment signal V includes adjustment signals v1, v2, v3, v4, v5 and v6. These signals v1 to v6 are arranged to be inputted to the video signal recording processing circuit 11, the amplifiers 12Y, 12b, and 12r, the recording amplifier 14, the reproduction amplifier 21, the amplifiers 23Y, 23b, 23r and the video signal reproduction processing circuit 24, respectively.

At each of the video signal recording processing circuit 11 and the video signal reproduction processing circuit 24, the delay time of a delay circuit which is arranged to control the timing of the color-difference signals Pb and Pr relative to the luminance signal Y and also the delay time of a delay circuit, which is arranged to control the timing of these signals relative to an external reference signal, are adjusted in accordance with the adjustment signal v1 or v6.

At the amplifiers 12Y, 12b and 12r and the amplifiers 23Y, 23b and 23r, the levels of the luminance signal Y and the color-difference signals Pb and Pr are individually controlled in accordance with the adjustment signals v2 and v5. Further, at the recording amplifier 14 and the reproduction amplifier 21, an equalizing process, signal levels, a recording current, etc., are adjusted in accordance with the adjustment signals v3 and v4.

In the embodiment described, the rotary encoder 6 is arranged to be used only for audio level adjustment which is expected to be frequently made. As for the video signals which require diverse adjustment actions on them, the rotary encoder 7 is singly arranged to be usable for all these adjustment actions. This arrangement not only greatly relieves the operator from the burden of operation but also does not require many parts. Besides, the audio and video rotary encoders are separately arranged while the selection buttons 8c for audio signal adjustment and the function buttons 8d are also separately arranged. The arrangement is very clear to the operator, so that the embodiment is easily operable.

What is claimed is:

1. An adjusting apparatus comprising:
   a) a plurality of audio adjusting means for making different kinds of adjustments relative to audio signals,
      at least one of the kinds of adjustments relative to the audio signal being made independently of the other kinds of adjustments relative to the audio signal;
   b) a plurality of video adjusting means for making different kinds of adjustments relative to video signals,
      at least one of the kinds of adjustments relative to the video signal being made independently of the other kinds of adjustments relative to the video signal;
   c) a first rotary encoder commonly used for actuating said plurality of audio adjusting means;
   d) a second rotary encoder commonly used for actuating said plurality of video adjusting means;
   e) a first selector for selectively actuating said plurality of audio adjusting means according to an operation of said first rotary encoder; and
   f) a second selector for selectively actuating said plurality of video adjusting means according to an operation of said second rotary encoder.

2. An apparatus according to claim 1, wherein each of said first and second selecting means includes a plurality of operation keys.

3. An apparatus according to claim 2, wherein the plurality of operation keys included in said first selecting means are arranged on a panel different from a panel on which the plurality of operation keys included in said second selecting means are arranged.

4. An apparatus according to claim 1, wherein said plurality of audio adjusting means includes a plurality of level adjusting means for adjusting levels of audio signals of a plurality of channels respectively.

5. An apparatus according to claim 4, wherein said plurality of video adjusting means includes a plurality of level adjusting means for adjusting levels of a luminance signal and a chrominance signal respectively.

6. An apparatus according to claim 5, further comprising mixing means for mixing the luminance signal and the chrominance signal, and wherein said plurality of video adjusting means further includes mixture level adjusting means for adjusting a level of a signal outputted from said mixing means.

7. An apparatus according to claim 4, wherein said plurality of video adjusting means includes delay time control means for controlling a delay time of a delay circuit arranged to adjust a relative timing between the luminance and chrominance signals.

8. An adjusting apparatus comprising:
   a) audio adjusting part including
      a plurality of first adjusting means making different kinds of adjustments relative to audio signals, at least one of the kinds of adjustments relative to the
audio signal being made independently of the other
kinds of adjustments relative to the audio signal;
a first rotary encoder commonly used for actuating said
plurality of first adjusting means to make the adjustments relative to the audio signals;
a first selector for selectively actuating said plurality of
first adjusting means according to operation of said
first rotary encoder; and b) video adjusting part including
a plurality of second adjusting means making different
kinds of adjustments relative to video signals, at least
one of the kinds of adjustments relative to the video
signal being made independently of the other kinds
of adjustments relative to the video signal;
a second rotary encoder commonly used for actuating
said plurality of second adjusting means to make
adjustments relative to the video signals;
a second selector for selectively actuating said plurality
of first adjusting means according to operation of
said second rotary encoder;
said audio and video part operating separately.

9. An apparatus according to claim 8, wherein said audio adjusting means is arranged to selectively adjust levels of audio signals of a plurality of channels.

10. An apparatus according to claim 9, wherein said video adjusting means is arranged to selectively adjust levels of luminance and chrominance signals.

11. An apparatus according to claim 10, further comprising mixing means for mixing the luminance signal and the chrominance signal, and wherein said video adjusting means is arranged to selectively adjust a level of the luminance signal, a level of the chrominance signal and a level of a signal outputted from said mixing means.

12. An apparatus according to claim 10, wherein said video adjusting means includes a delay time control means for controlling a delay time of a delay circuit arranged to adjust a relative timing between the luminance and chrominance signals.

13. A recording apparatus comprising:
a) a first rotary encoder commonly used for performing a plurality of kinds of adjusting operations relative to audio signals,
at least one of the kinds of adjusting operations relative to the audio signal being effected independently of the other kinds of adjusting operations relative to the audio signal;
b) a second rotary encoder commonly used for performing a plurality of kinds of adjusting operations relative to video signals,
at least one of the kinds of adjusting operations relative to the video signal being effected independently of the other kinds of adjusting operations relative to the video signal;
c) recording means for recording the audio signals and the video signals on a common recording medium;
d) audio adjusting means for selectively performing said plurality of adjusting operations relative to processing of the audio signals to be recorded, according to an operation of said first rotary encoder; and
e) video adjusting means for selectively performing said plurality of adjusting operations relative to processing of the video signals to be recorded, according to an operation of said second rotary encoder.

14. An apparatus according to claim 13, wherein said plurality of audio adjusting means include a plurality of level adjusting means for adjusting audio signal levels of a plurality of channels, respectively.

15. An apparatus according to claim 13, wherein said plurality of video adjusting means include a plurality of level adjusting means for adjusting luminance signal levels and chrominance signal levels, respectively.

16. An apparatus according to claim 13, wherein said recording medium includes a magnetic tape.

17. An adjusting apparatus comprising:
a) a plurality of audio adjusting means for making different kinds of adjustments relative to audio signals, each of said plurality of audio adjusting means adjusting one kind of the adjustment relative to the audio signals;
b) a plurality of video adjusting means for making different kinds of adjustments relative to video signals, each of said plurality of video adjusting means making one kind of the adjustment relative to the video signals;
c) first selecting means for selecting audio adjusting means from among said plurality of audio adjusting means;
d) second selecting means for selecting video adjusting means from among said plurality of video adjusting means;
e) a first movable member commonly used for controlling the plurality of audio adjusting means, the first movable member controlling the adjustment effected by the audio adjusting means selected by said first selecting means; and
f) a second movable member commonly used for controlling the plurality of video adjusting means, the second movable member controlling the adjustment effected by the video adjusting means selected by said second selecting means.

18. An apparatus according to claim 17, wherein said first selecting means and said second selecting means include a plurality of operating keys, respectively.

19. An apparatus according to claim 18, wherein the plurality of operating keys included in said first selecting means and the plurality of operating keys included in said second selecting means are arranged on different panels of the apparatus.

20. An apparatus according to claim 17, wherein said plurality of audio adjusting means include a plurality of level adjusting means for adjusting audio signal levels of a plurality of channels.

21. An apparatus according to claim 17, wherein said plurality of video adjusting means include a plurality of level adjusting means for adjusting levels of luminance signal and chrominance signal, respectively.

22. An apparatus according to claim 21, which includes mixing means for mixing said luminance signal and chrominance signal and wherein said plurality of video adjusting means further include mixed level adjusting means for adjusting signal levels outputted from said mixing means.

23. An apparatus according to claim 17, wherein said first movable member and said second movable member include a first rotary encoder and a second rotary encoder, respectively.

24. A recording and reproducing apparatus comprising:
a) a plurality of first adjusting means for making different kinds of adjustments relative to audio signals, each of said plurality of audio adjusting means adjusting one kind of the adjustment relative to the audio signals;
b) a plurality of video adjusting means for making different kinds of adjustments relative to video signals, each of said plurality of video adjusting means making one kind of the adjustment relative to the video signals;

c) first selecting means for selecting first adjusting means from among said plurality of first adjusting means;

d) second selecting means for selecting second adjusting means from among said plurality of second adjusting means;

e) a first rotary encoder commonly used for controlling the plurality of first adjusting means, the first rotary encoder controlling the adjustment effected by said first adjusting means selected by said first selecting means;

f) a second rotary encoder commonly used for controlling the plurality of second adjusting means, the second rotary encoder controlling the adjustment effected by the second adjusting means selected by said second selecting means;

g) recording means for recording the audio signal fed through the second adjusting means selected by said first selecting means and the information signal fed through the second adjusting means selected by said second selecting means on a common recording medium; and h) reproducing means for reproducing the audio signal and the information signal recorded by said recording means, wherein said first and second adjusting means also effect adjustment of the audio signal and the information signal reproduced by said reproducing means.

25. An apparatus according to claim 24, wherein said first adjusting means includes a recording level adjusting circuit for effecting level adjustment of the audio signal to be recorded by said recording means and a reproducing level adjusting circuit for effecting level adjustment of the audio signal reproduced by said reproducing means.

26. An apparatus according to claim 24, wherein said first selecting means includes a channel selecting circuit for selecting a channel of said audio signal.

27. An apparatus according to claim 24, further comprising first detecting means for detecting an amount of operation of said first rotary encoder.

28. An apparatus according to claim 27, wherein said first detecting means includes converting means for converting the amount of operation of said first rotary encoder into an adjusting value corresponding to the adjusting means selected by said first selecting means and said first adjusting means is arranged to effect the adjustment in response to said adjusting value.

29. An apparatus according to claim 28, further comprising second detecting means for detecting an amount of operation of said second rotary encoder.

30. An apparatus according to claim 29, wherein said second detecting means includes converting means for converting the amount of operation of said second rotary encoder into an adjusting value corresponding to the adjusting means selected by said second selecting means, and said second adjusting means is arranged to effect the adjustment in response to said adjusting value.

31. An apparatus according to claim 24, wherein said first selecting means and second selecting means include a plurality of operating keys, respectively.

32. An apparatus according to claim 31, wherein the operating keys included in said first selecting means and said first rotary encoder are arranged on the same panel on the apparatus.

33. An apparatus according to claim 24, wherein said recording medium includes a magnetic tape.

* * * * *

UNITED STATES PATENT AND TRADEMARK OFFICE
CERTIFICATE OF CORRECTION

PATENT NO. : 5,875,278
DATED : February 23, 1999
INVENTOR(S) : Yuka Kasuga, et al.

It is certified that error appears in the above-identified patent and that said Letters Patent is hereby corrected as shown below:

Column 1, line 25, "The arrangement to adjust the" should begin a new paragraph.
Column 1, line 41, delete "of" (second occurrence).

Signed and Sealed this

Twenty-eighth Day of December, 1999

Attest:

Q. TODD DICKINSON

*Attesting Officer*     *Acting Commissioner of Patents and Trademarks*